US005409074A

United States Patent [19]

Wilson et al.

[11] Patent Number: 5,409,074

[45] Date of Patent: Apr. 25, 1995

[54] MOTORIZED VEHICLE WITH FIBER-OPTIC JOYSTICK CONTROLLER

[75] Inventors: Harold R. Wilson, Holland, Mich.; Michael B. Miller, Christiansburg, Va.; John Eide, Fincastle, Va.; Anthony L. Bowman, Christiansburg, Va.; Robert T. Rogers, Sr., Blacksburg, Va.; David R. Hawks, Christiansburg, Va.; Philip J. Bakker, Holland, Mich.

[73] Assignees: Haworth, Inc., Holland, Mich.; Litton Systems, Inc., Beverly Hills, Calif.

[21] Appl. No.: 153,343

[22] Filed: Nov. 16, 1993

[51] Int. Cl.[6] ........................ B62D 11/04; A61G 5/04

[52] U.S. Cl. .................................... 180/6.5; 180/65.1; 180/333; 180/907; 359/144; 385/147

[58] Field of Search ...................... 180/6.5, 65.1, 65.2, 180/65.6, 333, 344, 907; 385/147; 312/22; 359/144, 143

[56] References Cited

U.S. PATENT DOCUMENTS

| | | | |
|---|---|---|---|
| 3,814,199 | 6/1974 | Jones | 180/6.5 |
| 3,934,181 | 1/1976 | Rosenthal | 180/6.5 |
| 4,306,314 | 12/1981 | Griffiths | 359/144 |
| 5,234,066 | 8/1993 | Ahsing et al. | 180/907 |

*Primary Examiner*—Mitchell J. Hill

*Attorney, Agent, or Firm*—Flynn, Thiel, Boutell & Tanis

[57] ABSTRACT

A motorized vehicle, particularly a wheelchair, having a joystick controller for controlling energization of driving motors which in turn drive vehicle wheels and control steering of the vehicle. The joystick controller includes fiber-optic arrangements which sense tilting movement of the joystick in forward, rearward, rightward or leftward directions, or a combination thereof. Light signals are generated of an intensity corresponding to the position of the joystick, which signals are converted into electric signals and supplied to a controller which in turn controls energization of the drive motors to control driving and steering of the vehicle.

19 Claims, 3 Drawing Sheets

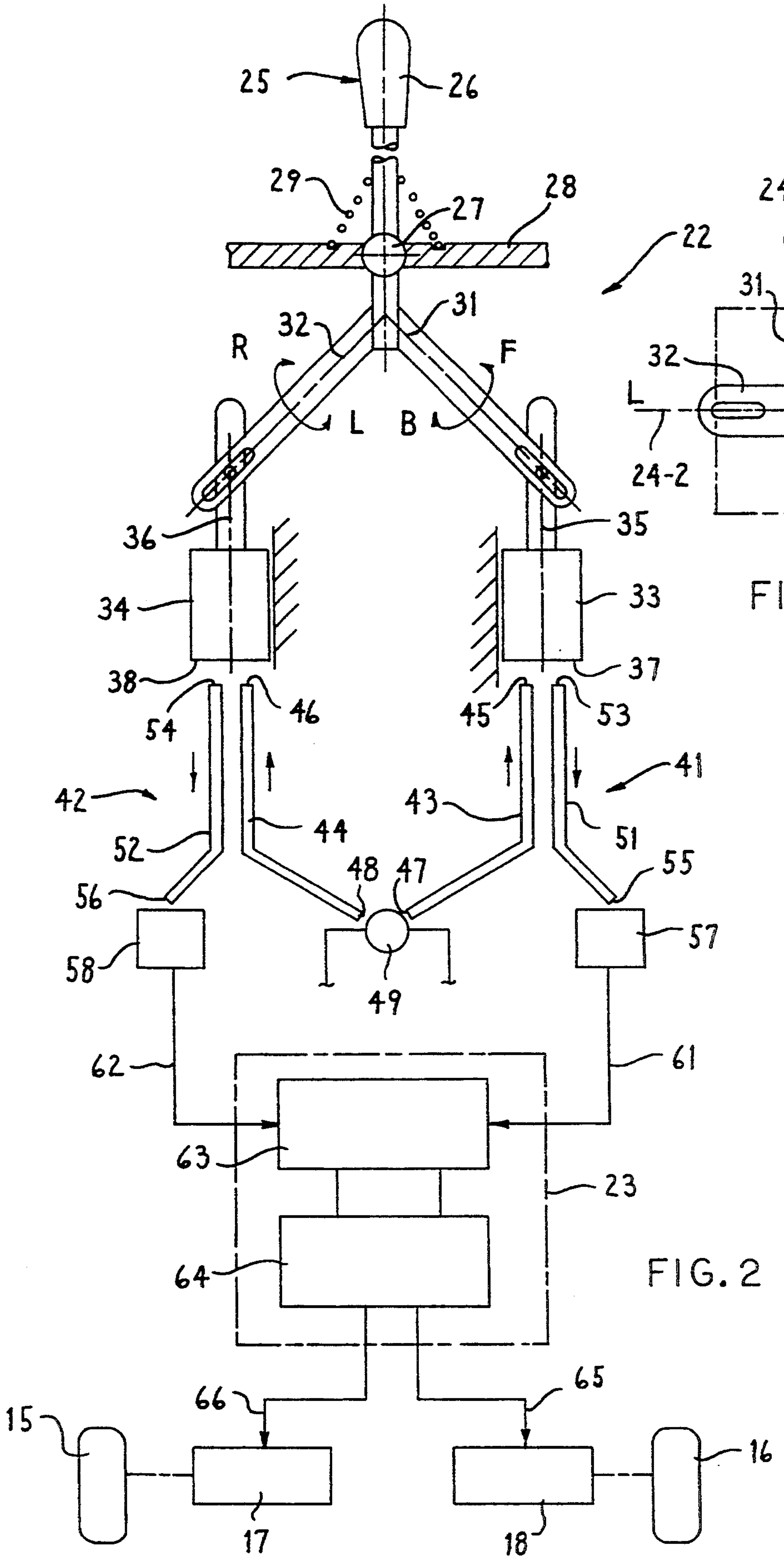
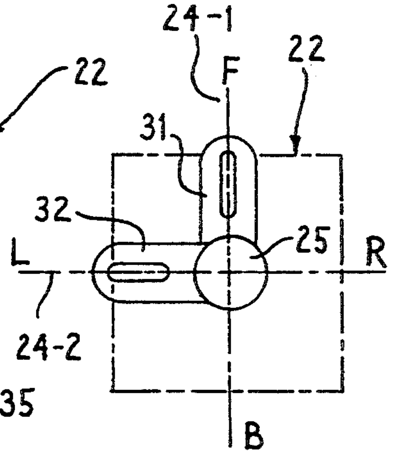
FIG. 2A
FIG. 2

MOTORIZED VEHICLE WITH FIBER-OPTIC JOYSTICK CONTROLLER

FIELD OF THE INVENTION

This invention relates to a motorized vehicle for a handicapped person, such as a motorized wheelchair, having an improved joystick controller.

BACKGROUND OF THE INVENTION

Most motorized wheelchairs use a manual controller of the joystick type. This joystick controller involves a manually-engageable control lever which is mounted on the arm of the wheelchair so as to be readily accessible to the occupant, with the control lever being normally maintained in an upright neutral position by biasing arrangements such as springs. The control lever or joystick is then pushed forwardly or rearwardly to respectively energize the drive wheels to carry out forward or rearward driving of the wheelchair, with the joystick being manually urged either rightwardly or leftwardly to cause corresponding rightward or leftward steering of the wheelchair, this causing a corresponding adjustment in the motors driving the right and left wheels.

The conventional joystick controller is normally of the inductive type. That is, the lower end of the joystick mounts a coil which is positioned between four stationary coils arranged in a generally rectangular pattern, which four stationary coils depict the forward, rearward, rightward and leftward directions. Movement of the joystick and its associated coil creates, in the stationary coils to which the moving coil approaches, appropriate voltage signals which are then transmitted to the wheelchair controller. This in turn appropriately drives the motors associated with the right and left drive wheels. Arrangements of this general type are well known and have been utilized for many years.

However, this inductive-type joystick controller has been observed to create problems of inadvertent wheelchair movement due to stray EMI or RFI signals. Such stray signals are picked up by the controller, which effectively acts as an antenna, and can cause false signals to be fed to the controller of the wheelchair, which in turn then provides undesired signals to the drive motors to cause undesired driving and/or steering. This is becoming an even greater and more common problem with the highly increased usage of equipment which generates radio frequency or electromagnetic signals, such as walkie talkies, cellular telephones and the like.

Accordingly, it is an object of this invention to provide an improved joystick controller for a motorized wheelchair, which joystick controller overcomes the above disadvantages by eliminating the sensitivity to EMI and RFI pickup, which eliminates any need for moving or contacting electrical parts, which can be of a rugged and heavy-duty design which is operable over a wide range of operating temperatures, and which provides improved convenience, reliability and safety for the wheelchair occupant.

More specifically, the present invention relates to an improved motorized wheelchair wherein the joystick controller employs a fiber-optic arrangement for sensing joystick movement, which fiber-optic arrangement generates output light signals of variable intensity in proportion to the displacement of the joystick movement, which output light signals are converted to electrical signals and supplied to a conventional wheelchair controller for controlling the driving of the drive wheels.

In a preferred embodiment, the improved joystick controller for the motorized wheelchair employs a single light source which supplies light through fiber-optic cables for discharge against a pair of reflective surfaces which are associated with a pair of followers, which followers respond to the two planes of movement of the joystick. A fiber-optic pickup cable is associated with each reflective surface, with the intensity of the light received by the pickup cable being a function of the position of the reflective surface relative thereto. The intensity of the light supplied to the pickup cable is then transmitted to a light detector which converts the light signal to an electrical signal, the magnitude of which is proportional to the intensity of the light signal. The electrical signal is then transmitted to a controller and processed in a generally conventional manner for controlling the driving of the wheelchair wheels.

Other objects and purposes of the invention will be apparent to persons familiar with arrangements of this general type upon reading the following specification and inspecting the accompanying drawings.

BRIEF DESCRIPTION OF THE DRAWINGS

FIG. 2 is a diagrammatic view which illustrates the arrangement of the improved fiber-optic joystick controller of the present invention, and its cooperation with the wheelchair controller and the drive wheels of the wheelchair.

FIG. 2A is a top view of the joystick controller showing the front (F), back (B), right (R) and left (L) directions.

Figure 1:
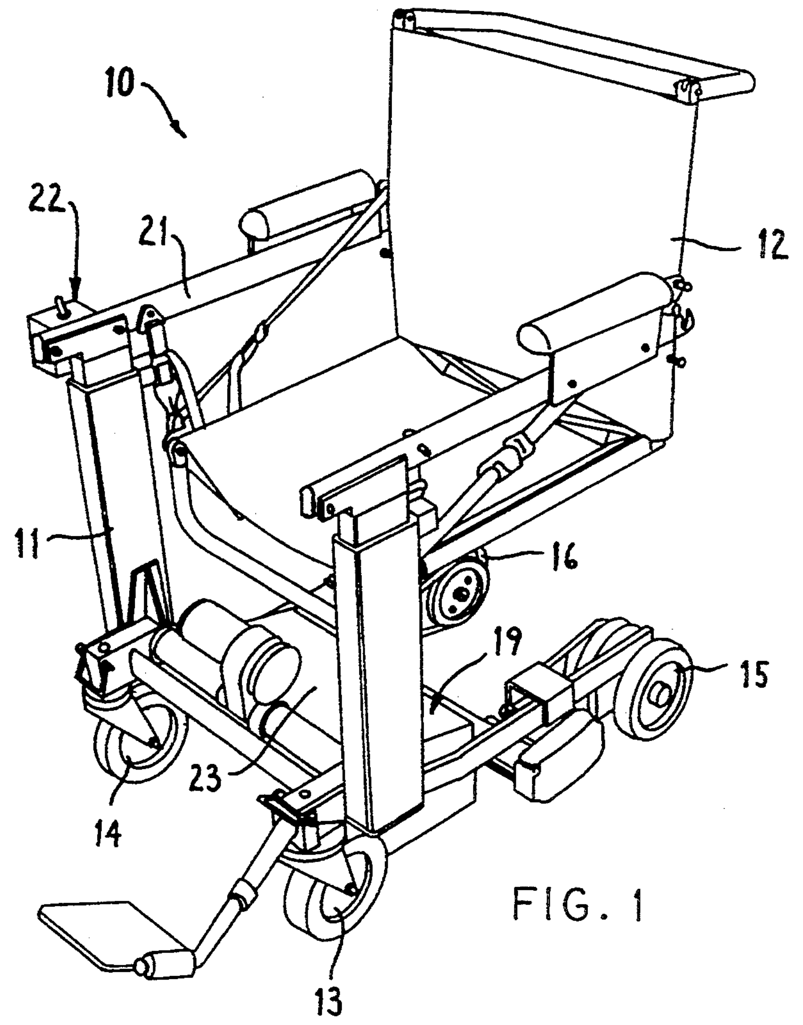
FIG. 1 is a perspective view of a conventional motorized wheelchair having a joystick controller associated therewith for controlling driving of the rear wheels of the wheelchair.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the wheelchair and designated parts thereof. The words "forward" and "rearward" will be used in conjunction with these directions as perceived by an occupant sitting in the seat of the wheelchair, and the words "right" and "left" will also be used in this same connotation. The aforementioned terms will include variations thereof.

DETAILED DESCRIPTION

Referring to FIG. 1, there is illustrated a known vehicle for a handicapped person, specifically a motorized wheelchair 10 having a frame 11 which supports thereon an occupant seat 12. The frame is supported on a plurality of wheels including front wheels 13 and 14, these conventionally being caster-type wheels, and rear driving wheels 15 and 16. The rear driving wheels 15 and 16 are typically driven from respective low-voltage direct current motors 17 and 18 (FIG. 2) in a conventional manner, generally through appropriate speed reducers. The drive motors as well as a power pack 19, which includes batteries and related controls, including the main control unit 23, are typically mounted on the base part of the wheelchair frame. The wheelchair also has a manual controller 22 mounted adjacent or on one of the arms 21 thereof so as to be readily accessible to the wheelchair occupant. The controller 22 is commonly referred to as a "joystick" controller and employs a control lever or joystick 25 (FIG. 2A) which is swivelably mounted so that the lever can be manually tilted forwardly F or rearwardly B in a first vertical plane 24-1 to control the respective forward and rearward motorized driving of the wheelchair, and can also be manually tilted rightwardly R or leftwardly L in a second vertical plane 24-2 which is perpendicular to the first plane so as to control respective steering of the wheelchair in the respective right and left directions. Such arrangement and operation is conventional and well known.

As noted above, the conventional joystick controller generally is based on the induction principle in that it contains five coils, four stationary and one movably mounted on the joystick member so as to positionally react with the four stationary coils to generate electrical signals which are indicative of the moving direction and displacement of the joystick member so as to supply appropriate signals to the main controller 23 which appropriately controls the energization of the left and right motors 17 and 18 to drive the wheelchair in accordance with the displacement of the joystick.

According to the present invention, the joystick controller 22 is, as illustrated by FIG. 2, of an improved fiber-optic construction so as to provide light signals which vary in intensity in response to tilting or swiveling movement of the joystick member, which light intensity signals are thereafter converted to corresponding electrical signals which are then supplied to the controller for controlling appropriate energization of the driving motors 17 and 18. The joystick controllers is thus immune to external electromagnetic or radio frequency signals which may otherwise disrupt or interfere with the proper signals being generated by the joystick controller.

In this improved joystick controller 22, and as illustrated by FIG. 2, the control lever or joystick 25 is typically provided with a gripping knob 26 on the upper outer end thereof, and the joystick 25 normally has a ball-like mounting portion 27 which provides a swivel-type mounting of the joystick on a suitable supporting wall or housing 28. A spring arrangement 29 typically cooperates with the joystick 25 to resiliently urge it into a vertically upright position, this being the normal neutral position wherein the drive motors for the wheelchair are deactivated. This overall construction of the joystick member and its mounting is conventional, and can be accomplished in many different and conventional ways.

The joystick member 25, adjacent its lower end, has a pair of activating arms 31 and 32 fixed thereto and projecting transversely or perpendicularly outwardly from the main axis of the joystick, with the arms 31 and 32 in the illustrated embodiment being spaced horizontally by an angle of about 90° so that the arm 31 will vertically swing up and down in response to forward or rearward tilting of the joystick (this being the first plane 24-1, i.e. the normal direction of driving of the wheelchair), whereas the arm 32 will normally vertically swing up and down in response to transverse or sideward tilting of the joystick (this being the second plane 24-2 for controlling rightward or leftward steering of the wheelchair). The arms 31 and 32 in turn cause movement of and control the position of slide-type followers 33 and 34, respectively, the latter being drivingly coupled to the respective arms in any conventional manner, such as a pin-and-slot arrangement, so as to always follow the movement of the respective arm. The followers 33 and 34 are thus each movable generally along the directions 35 and 36, the latter being illustrated as parallel. It will be appreciated, however, that such parallelism is not a requirement since other angled relationships can be utilized.

The followers 33 and 34 are provided thereon with a large reflective surface 37 and 38, respectively. These reflective surfaces 37 and 38 are generally enlarged in a direction which extends approximately perpendicularly with respect to the respective directions of movement 35 and 36. The reflective surfaces are preferably provided by providing appropriate highly polished surfaces on the followers, so that the surfaces have mirror-like characteristics.

As illustrated by FIG. 2, the reflective surfaces and the respective followers are normally maintained in a neutral position designated N when the joystick 25 is in its normal upright or neutral position, in which position the drive motors are deactivated. The follower 33 can be moved upwardly or downwardly relative to this neutral position in response to whether the joystick is moved forwardly or rearwardly. Similarly, the other follower 34 likewise will move upwardly or downwardly relative to the neural position in response to sideward tilting direction of the joystick 25.

To sense the displacement of the joystick 25, the improved joystick controller 22 employs first and second fiber-optic arrangements 41 and 42 which cooperate with the respective followers 33 and 34 to sense movement of the joystick in or parallel to the first plane 24-1 (i.e., forward or rearward tilting of the joystick) or the second perpendicular plane 24-2 (i.e., rightward or leftward titling of the joystick). These fiber-optic arrangements 41 and 42 are then utilized to generate appropriate output light signals, the intensity of which varies in response to the position of the respective reflective surface 37 and 38, which output light signals are then converted to corresponding electrical signals for supply to the main control 23.

The first fiber-optic arrangement 41 is provided for sensing joystick movement in the first vertical plane 24-1, namely the front-rearward movement. This arrangement includes an elongate fiber-optic supply cable or pipe 43 having a discharge or output end 45 directed generally toward but spaced a small distance from the opposed reflective surface 37 when the latter is in the neutral position N. The other end of the fiber-optic supply cable 43 has a input end 47 which is positioned closely adjacent a light source 49, the latter preferably comprising a conventional light emitting diode (i.e., LED), although other light sources can obviously be utilized.

The first fiber-optic arrangement 41 also includes an elongate fiber-optic pickup or return cable 51 which at one end thereof defines an input or pickup opening 53, the latter being disposed in directly opposed but spaced relationship from the respective reflective surface 37. The other end of this pickup or return cable 51 terminates in a discharge or output end 55, the latter being associated with a photosensitive detector 57 for receiving thereon the light energy signal which is discharged from the pickup cable 51.

The discharge end 45 of supply cable 43, and the pickup end 53 of return cable 51, are preferably disposed in sidewardly spaced relationship and both are oriented generally in approximately the same or similar directions so as to be directed generally toward the opposed reflective surface 37 to prevent any light discharged from the opening 45 from directly entering the pickup opening 53 without first being reflected off the surface 37.

The second fiber-optic arrangement 42 is of generally similar construction and includes a fiber-optic supply cable 44 having its discharge or output end spaced from but directed toward the opposed reflective surface 38, with the other or input end 48 of the cable 44 being disposed adjacent the light source 49 for receiving light energy therefrom. A fiber-optic pickup or return cable 52 has its input or pickup end 54 disposed adjacent and opposed to the reflective surface 38, and the other end, namely the discharge end 56, disposed for cooperation with a further photosensitive detector 58 which receives the light energy output signal emitted from the cable 52. The openings 46 and 54 are positioned for cooperation with the opposed reflective surface 38 in the same manner as the opening 45 and 53 are positioned relative to the surface 37.

The photosensitive detectors 57 and 58 are conventional, such as P-I-N or photodiodes, and convert the light signal into an electrical signal, with the intensity or magnitude of the electrical signal being generally proportional to the intensity of the inputted light signal. The electrical signals from the detectors 57 and 58 are then transmitted at 61 and 62 to the main controller 23. This main controller 23, in the illustrated embodiment, preferably provides a digital output, and hence includes an A/D (analog/digital) converter 63 for receiving the signals from the light detectors. The converted digital signals are then transmitted from converter 63 to the main portion 64 of the controller, this typically being a microprocessor. This microprocessor is conventional and receive and analyzes the input signals and then transmits appropriate output signals 65 and 66 to the respective motors 18 and 17, the latter in turn then being appropriately energized to effect appropriate driving of the respective rear drive wheels 15 and 16 in a conventional manner.

For example, when the joystick member 25 is moved solely forward in the first plane 24-1 to effect forward driving, only the fiber-optic arrangement 41 is effected so that the signal from detector 51 is supplied at 61 to the converter 63, with the signal to the converter being proportional to the forward tilting of the joystick member. This signal is then supplied to the microprocessor 64 which in turn outputs an appropriate signal (i.e., a positive signal) at 65 and 66 to both motors 17 and 18, whereupon both motors are driven equally at the desired forward speed to effect forward driving of the wheelchair. In similar fashion, when the joystick member 25 is tilted solely rearwardly within plane 24-1, a different intensity light signal is generated by the fiber-optic arrangement 41, whereby a different intensity electrical signal 61 is supplied to the converter 63 and into the microprocessor 64, which in turn senses that this is now effectively a negative signal (i.e., being on the opposite side of the zero point) and the microprocessor in turn transmits appropriate signals (i.e., negative signals) 65 and 66 to motors 17 and 18 to effect driving thereof in a reverse direction.

When the joystick is tilted solely in the steering plane 24-2, such as to the left, then only the fiber-optic arrangement 42 is effectively activated so that an appropriate light intensity signal, which is a function of the degree of tilting of the joystick member 25, is transmitted to the detector 58 and is converted to an appropriate electrical signal which is supplied at 62 to the converter 63, which in turn supplies a signal to the microprocessor 64. The microprocessor 64 processes this signal and then supplies appropriate signals at 65 and 66 so that motors 17 and 18 are appropriately energized. In a situation where the joystick member is tilted solely leftwardly, then substantially equal signals 65 and 66 are applied to the motors 17 and 18, but the signals are effectively of opposite polarity such as plus and minus signals, so that motor 17 is reversely driven and motor 18 is forwardly driven to effect leftward turning of the wheelchair substantially in place. The same performance generally occurs if the joystick member is deflected solely rightwardly except that the light intensity signal is now of a magnitude which is on the other side of the zero point from the signal which is generated when the joystick is deflected leftwardly. This light intensity signal is then converted to an electrical signal and supplied to the microprocessor 64 in the same manner, and the microprocessor in turn again supplies signals to both motors 17 and 18. In the case of rightward deflection of the joystick, however, the motor 18 effects reverse driving of the wheel 16 and the motor 17 effects forward driving of the wheel 15, so that the wheelchair effectively turns rightwardly while staying in place.

Obviously, under a more normal circumstance, the joystick member 25 is deflected or swiveled so as to effect both driving of the rear wheels and steering, this being a combination of movement in both planes 24-1 and 24-2. In such case, signals are supplied to the main controller 23 from both detectors 57 and 58, which signals are processed in a conventional manner in the microprocessor 64 so that differing signals 65 and 66 are then supplied to the motors 17 and 18, whereby one motor will be rotated at a speed differently from the other motor so as to effect not only driving of the wheelchair but turning or steering thereof in the desired direction. This control of the motors 17 and 18 by a controller 23 in response to signals received from a joystick is conventional, and is not believed to require further explanation since such control is well known and understood by those familiar with motorized vehicles of this type.

Figure 3:
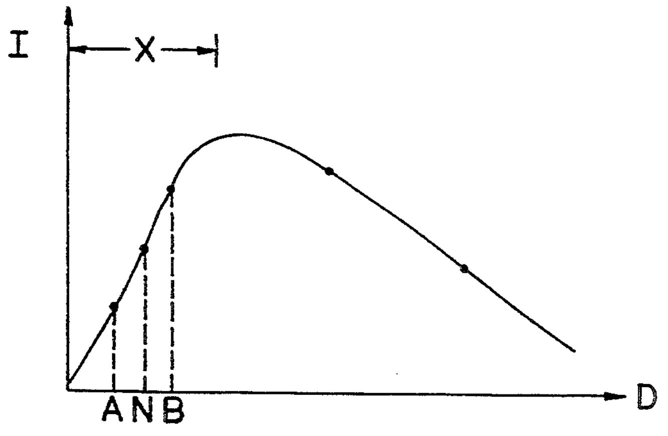
FIG. 3 diagrammatically illustrates the relationship between reflected light intensity and separation distance between the fiber-optic pickup point and the reflective surface.

With the improved joystick controller 22 of the present invention, the displacement of the reflective surfaces 37 and 38 away from the neutral position N increases or decreases the distance between the reflective surface and the opposed openings 45, 53 (or 46, 54). This appropriately increases or decreases the intensity of light which is reflected back into the respective pickup opening 45 or 54. For example, and referring to FIG. 3, there is diagrammatically illustrated the intensity of light which is reflected back off the reflective surface into the pickup opening in proportion to the distance between the reflective surface and the opposed pickup opening. As indicated, when the reflective surface is extremely close to the pickup opening, very little light is reflected back into the pickup opening. The amount of light reflected back into the pickup opening increased generally linearly in proportion to movement of the reflective surface away from the openings until reaching a certain distance, following which the magnitude of light reflected back into the pickup opening then begins to decrease as the separation distance continues to increase. In operation of the fiber-optic joystick accordingly to the present invention, the operation preferably occurs during the steep slope portion of the curve, namely the portion wherein the reflective surface is positioned more closely adjacent the pickup opening, this being the curved portion designated X in FIG. 3.

More specifically, a selected portion of the generally linear curve is utilized, such as the portion extending between the points designated A and B. The center of this generally linear range is then selected as the neutral point or position N, in which position the reflective surface is spaced a predetermined distance from the pickup opening. In this neutral position, a certain light intensity is reflected back into the respective pickup opening and transmitted to the respective light detector. A corresponding electrical signal as transmitted from the light detector to the main controller is then used as a zero point, at which zero point no driving signals are transmitted to the drive motors. As the follower and the respective reflective surface is moved away from the neutral position N due to tilting of the joystick in one direction within the selected plane, this increases the intensity of the light signal, which is then transmitted to the appropriate light detector and thence to the controller for causing appropriate energization of the driving motors. Conversely, if the joystick is tilted in the opposite direction within the same plane, then the respective reflective surface is moved away from the neutral position N toward the pickup opening, thereby decreasing the amount of light energy which is reflected into the pickup opening (along the curve towards the point A in FIG. 3), whereby the appropriate light intensity signal is again transmitted to the light detector and thence to the controller which in turn provides for appropriate energization of the driving motors.

While the invention as described and illustrated above references the use of fiber-optic cables or pipes 43, 44, 51 and 52, and while such may comprise a single optical fiber, it will be appreciate that each will preferably be defined by a bundle of optical fibers so as to improve the quantity of light energy which can be transmitted to and reflected off the respective surfaces. While the invention discloses a separate fiber-optic supply cable for each reflective surface, it will be appreciated that under certain conditions a single supply cable may be capable of supplying light energy to both reflective surfaces, although the use of separate or individual supply cables is preferred.

While multiple light sources can also be provided, nevertheless use of a single light source is highly preferred since such thus accurately senses joystick movement in both of the first and second planes, and one need not be concerned about the problems associated with different or variable energy light sources if two or more light sources are utilized. Further, in case of a light source failure, use of a single light source is highly preferred since this thus totally deactivates the control, and prevents improper operation which might occur if multiple light sources are utilized.

While the invention in a preferred embodiment, and as described above, utilized only two followers for sensing forward, rearward, rightward and leftward joystick deflection, it will be appreciated that the system can also utilize additional followers. For example, four followers can be provided, one for sensing each of forward, rearward, right and left joystick deflection. Such system would basically function in the same manner except that the overall fiber-optic system would involve four such arrangements, one associated with the reflective surface on each follower. A system employing only two followers, as described above, however, is preferred since such is believed to provide a higher degree of sensitivity and controllability, and in addition is believed to provide a more compact and economical controller.

Figure 4:
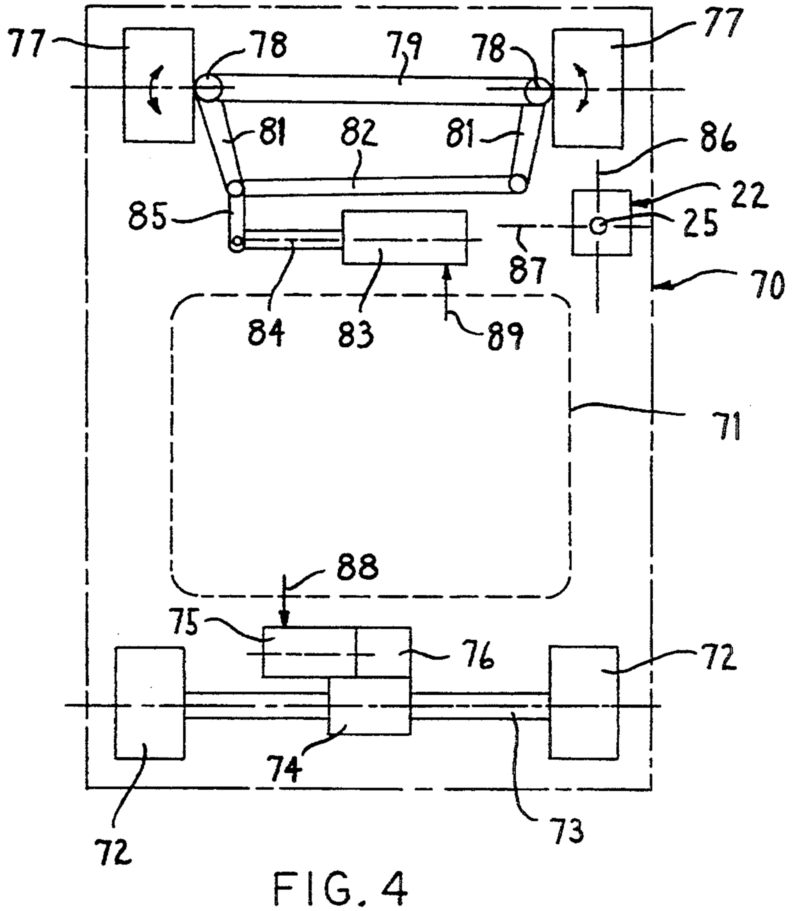
FIG. 4 diagrammatically illustrates a variation of a motorized vehicle for a handicapped person, which vehicle incorporates the improved fiber-optic joystick controller.

Referring now to FIG. 4, there is illustrated a variation of a motorized vehicle 70 for a handicapped person, which vehicle incorporates therein and is driveable and steerable by use of the improved fiber-optic joystick controller 22 of the present invention. This vehicle 70 is normally referred to in the healthcare industry as a "scooter" and is used to facilitate movement of handicapped persons. Such scooter 70 includes a frame on which an occupant seat 71 is provided, which seat 71 typically is for a single individual, but can obviously be designed to accommodate more than one person. A joystick controller is typically provided adjacent the seat so as to be accessible by the occupant, and in the present invention the improved fiber-optic joystick controller 22 (as described above) is provided. The scooter 70 has a pair of rear driving wheels 72 which are joined to a rear drive axle 73 having a conventional differential 74, with the rear axle being driven by a first electric drive motor 75 through a conventional speed reducer 76. This motor 75 is typically a low-voltage reversible direct-current motor which is driven from a power pack (i.e., a battery pack) mounted on the scooter in a conventional manner. This motor 75 is provided to effect simultaneous driving of the rear wheels 72 either forwardly or rearwardly to control driving of the scooter.

The scooter 70 also includes a pair of front wheels 77 which are not driven, but which are steerable. These wheels 77 are mounted on conventional kingpin arrangements 78 provided adjacent opposite ends of the front axle 79. The kingpin arrangements in turn have conventional steering arms or levers 81 joined thereto and projecting therefrom, the latter being connected by a conventional tie rod 82. A further drive motor 83 is provided, the latter being drivingly joined to a conventional linear actuator 84 which in turn couples to a drive extension 85 associated with either the tie rod 82 or one of the steering arms 81. The motor 83 is also normally a conventional low-voltage direct-current reversible motor driven from the battery pack provided on the vehicle. Energization of motor 83 in response to a signal generated initially from the joystick controller 22 hence effects swinging of the steering arms 81 to thus cause pivoting of the front steering wheels 77 substantially about vertical axes defined by the respective kingpin arrangements 78 to thus carry out rightward and leftward steering of the scooter in response to an occupant command.

The overall arrangement of the scooter 70, as briefly described above and as diagrammatically illustrated in FIG. 4, is conventional. With the provision of the improved fiber-optic joystick controller 22 of the present invention, however, when the joystick member 25 is tilted forwardly or rearwardly within the plane designated 86 so as to effect forward or reverse driving movement of the scooter, then this movement is sensed by the fiber-optic arrangement 41 (FIG. 2) which then transmits the electrical signal 61 (FIG. 2) to the main controller 23, and this signal in turn is then transmitted from the controller to solely the rear drive motor 75 as indicated at 88.

When steering is desired, the occupant tilts the joystick member 25 sidewardly within or parallel to the second vertical plane 87. This then activates the other fiber-optic arrangement 42 (FIG. 2) such that the output signal 62 (FIG. 2) is transmitted to the main controller 23 which in turn transmits an appropriate steering signal 89 solely to the steering motor 83.

This motorized vehicle 70, incorporating therein the improved fiber-optic joystick controller 22, hence possesses the improved safety, convenience and reliability which is achieved when the joystick controller is utilized on a motorized wheelchair, as described above.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a motorized wheelchair having a frame, an occupant seat mounted on said frame, a plurality of ground-engaging wheels mounted on the frame, a first direct current motor mounted on the frame for rotatably driving a first said wheel, a second direct current motor mounted on the frame for rotatably driving a second said wheel, control means for controlling energization of said first and second motors to permit driving of said wheelchair both forwardly and rearwardly as well as steering of the wheelchair rightwardly and leftwardly, and a joystick controller for supplying signals to the control means for controlling the energizing of the first and second motors, said joystick controller including a manually-movable joystick which is movable in a first forward-rearward direction and in a second right-left direction for sending signals to said control means for controlling driving and steering of said wheelchair, the improvement wherein said joystick controller includes fiber-optic sensing and signaling means which senses movement of the joystick in the first and/or second directions by variations in light intensity for generating a signal to said control means to control driving and steering of the wheelchair.

2. A motorized wheelchair according to claim 1, wherein said fiber-optic sensing and signaling means includes first fiber-optic means which senses movement of the joystick in the first direction for generating a first signal to said control means to control driving of the wheelchair in said first direction, and second fiber-optic means which senses movement of the joystick in said second direction for generating a second signal to the control means to control steering of the wheelchair.

3. A motorized wheelchair according to claim 2, wherein said joystick controller includes first and second output members which are movable in response to movement of said joystick in said first and second directions respectively;

said first and second fiber-optic means including first and second light reflective surfaces provided on said first and second output members respectively;

said first and second fiber-optic means including a fiber-optic supply passage having a discharge end disposed adjacent and directed generally toward said reflective surfaces for discharging light energy against said surfaces;

a light source disposed adjacent an input end of said fiber-optic supply passage for supplying light energy thereto;

said first and second fiber-optic means respectively including first and second fiber-optic discharge passages having input ends positioned adjacent the respective first and second reflective surfaces for receiving light energy reflected off the respective surface; and means including first and second light detectors disposed adjacent discharge ends of the respective first and second fiber-optic discharge passages for receiving light energy signals discharged from the respective discharge passages and for converting the light energy signals into electrical signals which are supplied to said control means.

4. A motorized wheelchair according to claim 3, wherein said fiber-optic supply passage includes first and second fiber-optic supply paths having discharge ends thereof disposed adjacent the respective first and second reflective surfaces for discharging light energy solely against the respective reflective surface, and said light source comprising a single light disposed adjacent input ends of said first and second fiber-optic supply paths so that said single light supplies light energy to both of said fiber-optic supply paths.

5. A motorized wheelchair according to claim 3, wherein the discharge end of the fiber-optic supply passage, the input ends of the fiber-optic discharge passages, and the reflective surfaces cooperate to define a spacial relationship so that the intensity of the light energy which reflects off the reflective surface into the inlet end of the respective fiber-optic discharge passage varies as the reflective surface moves relative to the respective input end.

6. A motorized wheelchair according to claim 2, wherein said first and second fiber-optic means include light emitting means for transmitting light, said first and second fiber-optic means each include light receiving means for receiving said transmitted light, and said joystick controller includes a control member which senses and responds to joystick movement to vary the intensity of light received by the receiver.

7. A motorized wheelchair according to claim 6, wherein said first and second fiber-optic means include respective first and second light reflective surfaces to reflect light from said light emitting means to said light receiving means.

8. A motorized wheelchair according to claim 7, wherein said reflective surfaces are movable relative to said light receiving means in response to movement of said joystick to vary the intensity of said transmitted light.

9. In a motorized vehicle, such as for a handicapped person, said vehicle having a frame, an occupant seat mounted on said frame, a plurality of ground-engaging wheels mounted on the frame, first and second direct current motors mounted on the frame and cooperating with the wheels for effecting driving and steering of the vehicle, control means for controlling energization of said first and second motors to permit driving of said vehicle both forwardly and rearwardly as well as steering of the vehicle rightwardly and leftwardly, and a joystick controller for supplying signals to the control means for controlling the energizing of the first and second motors, said joystick controller including a manually-movable joystick which is movable in a first forward-rearward direction and in a second right-left direction for sending signals to said control means for controlling driving and steering of said vehicle, the improvement wherein said joystick controller includes first fiber-optic means which senses movement of the joystick in the first direction for generating a first signal to said control means to control driving of the vehicle in said first direction, and second fiber-optic means which senses movement of the joystick in said second direction for generating a second signal to the control means to control steering of the vehicle, each of said first and second fiber optic means including a light receiver, and said first and second fiber optic means including a light emitter transmitting light to said receivers over variable length paths which vary in response to movement of said joystick.

10. A motorized vehicle according to claim 9, wherein said joystick controller includes first and second output members which are movable in response to movement of said joystick in said first and second directions respectively;

said first and second fiber-optic means including first and second light reflective surfaces provided on said first and second output members respectively;

said emitter of said first and second fiber-optic means including a fiber-optic supply passage having a discharge end disposed adjacent and directed generally toward said reflective surfaces for discharging light energy against said surfaces;

a light source disposed adjacent an input end of said fiber-optic supply passage for supplying energy thereto;

said receivers of said first and second fiber-optic means respectively including first and second fiber-optic discharge passages having input ends positioned adjacent the respective first and second reflective surfaces for receiving light energy reflected off the respective surface; and means including first and second light detectors disposed adjacent discharge ends of the respective first and second fiber-optic discharge passages for receiving light energy signals discharged from the respective discharge passages and for converting the light energy signals into electrical signals which are supplied to said control means.

11. A motorized vehicle according to claim 10, wherein said fiber-optic supply passage includes first and second fiber-optic supply paths having discharge ends thereof disposed adjacent the respective first and second reflective surfaces for discharging energy solely against the respective reflective surface, and said light source comprising a single light disposed adjacent input ends of said first and second fiber-optic supply paths so that said single light supplies light energy to both of said fiber-optic supply paths.

12. A motorized vehicle according to claim 11, wherein the discharge end of the fiber-optic supply passages, the input ends of the fiber-optic discharge passages, and the reflective surfaces cooperate to define a spacial relationship so that the intensity of the light energy which reflects off the reflective surface into the inlet end of the respective fiber-optic discharge passage varies as the reflective surface moves relative to the respective input end.

13. A motorized vehicle according to claim 9, wherein said first motor drives solely a pair of rear wheels, said second motor solely controls steering of a pair of front wheels, and said first and second signals control said first and second motors respectively.

14. A motorized vehicle according to claim 9, wherein said first motor drives solely one of a pair of rear driving wheels and said second motor drives solely the other of said pair of rear driving wheels, and each of said first and second signals controls both of said first and second motors.

15. A motorized vehicle according to claim 9, wherein said first and second fiber-optic means include respective first and second light reflective surfaces to reflect light from said emitter to said receivers.

16. A motorized vehicle according to claim 15, wherein said reflective surfaces are movable relative to said respective receivers in response to joystick movement to vary the lengths of said paths.

17. In a motorized vehicle having a frame, an occupant seat mounted on said frame, a plurality of ground-engaging wheels mounted on the frame, a first direct current motor mounted on the frame for rotatably driving a first said wheel, a second direct current motor mounted on the frame for rotatably driving a second said wheel, control means for controlling energization of said first and second motors to permit driving of said vehicle both forwardly and rearwardly as well as steering of the vehicle rightwardly and leftwardly, and a joystick controller for supplying signals to the control means for controlling the energizing of the first and second motors, said joystick controller including a manually-movable joystick which is movable in a first forward-rearward direction and in a second right-left direction for sending signals to said control means for controlling driving and steering of said vehicle, the improvement wherein said joystick controller includes fiber-optic sensing and signaling means which senses movement of the joystick in the first and/or second directions for generating a signal to said control means to control driving and steering of the vehicle, said fiber-optic sensing and signaling means including (1) a light emitter transmitting light to be sensed, (2) a light receiver for receiving said transmitted light, and (3) a member which senses and responds to movement of the joystick for varying the intensity of the light received by the receiver.

18. A motorized vehicle according to claim 17, wherein the length of a path over which said transmitted light travels from said emitter to said receiver is variable and said member is movable in response to said joystick movement to vary the length of said path and vary the intensity of the light received by said receiver.

19. A motorized vehicle according to claim 18, wherein said fiber-optic sensing and signaling means includes a reflective surface on said member to reflect said transmitted light from said emitter to said receiver, said reflective surface movable in response to movement of said joystick to vary the path length travelled by said transmitted light.

* * * * *